United States Patent
Kabeya et al.

(10) Patent No.: US 10,014,814 B2
(45) Date of Patent: Jul. 3, 2018

(54) MOTOR CONTROL DEVICE AND METHOD

(71) Applicant: Kabushiki Kaisha Toshiba, Minato-ku (JP)

(72) Inventors: Satoki Kabeya, Fuchu (JP); Shouji Onda, Kunitachi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/435,836

(22) Filed: Feb. 17, 2017

(65) Prior Publication Data
US 2017/0257051 A1 Sep. 7, 2017

(30) Foreign Application Priority Data
Mar. 3, 2016 (JP) ................................. 2016-041555

(51) Int. Cl.
H02P 29/024 (2016.01)
H02P 21/00 (2016.01)
H02P 27/08 (2006.01)

(52) U.S. Cl.
CPC ............ H02P 29/024 (2013.01); H02P 21/00 (2013.01); H02P 27/08 (2013.01)

(58) Field of Classification Search
CPC ...................................................... H02P 29/24
See application file for complete search history.

(56) References Cited

U.S. PATENT DOCUMENTS

| | | | | |
|---|---|---|---|---|
| 6,232,737 B1 * | 5/2001 | Kachi | ................ | G05B 19/4062 318/271 |
| 7,414,820 B2 * | 8/2008 | Kuo | ..................... | H02H 11/002 361/77 |
| 8,300,436 B2 * | 10/2012 | Ha | ...................... | H02M 1/4216 307/127 |
| 8,872,461 B2 * | 10/2014 | Kaneko | .................. | H02P 1/022 318/478 |

FOREIGN PATENT DOCUMENTS

| | | |
|---|---|---|
| JP | 5081633 | 11/2012 |
| JP | 5331523 | 10/2013 |
| JP | 2014-23282 | 2/2014 |

\* cited by examiner

*Primary Examiner* — Bentsu Ro
(74) *Attorney, Agent, or Firm* — Oblon, McClelland, Maier & Neustadt, L.L.P.

(57) ABSTRACT

A motor control device includes a power inverter, a phase converter, and a detector. The power inverter is configured to convert input power for a motor into a three-phase alternating current. The phase converter is configured to convert the three-phase alternating current into a two-phase alternating current having a d-axis current component and a q-axis current component. The detector is configured to detect a misconnection between current detectors which are each configured to detect the three-phase alternating current.

16 Claims, 14 Drawing Sheets

STATIONARY COORDINATE SYSTEM

ROTARY COORDINATE SYSTEM

TEMPORAL CHANGE OF d-q-AXIS CURRENT COMPONENTS

STATIONARY COORDINATE SYSTEM

ROTARY COORDINATE SYSTEM

TEMPORAL CHANGE OF d-q-AXIS CURRENT COMPONENTS

MOTOR CONTROL DEVICE AND METHOD

CROSS-REFERENCE TO RELATED APPLICATION

This application is based upon and claims the benefit of priority from Japanese Patent Application No. 2016-41555, filed Mar. 3, 2016; the entire contents of which are incorporated herein by reference.

BACKGROUND

Field

Embodiments of the present invention generally relate to a motor control device.

Related Art

In related art, a driving device such as an inverter which is mounted on an electric vehicle undergoes an inspection for presence of an initial failure and the like, in which an aging test such as electrifying using an LR load for a certain period of time before shipping is performed. In the aging test, the test is performed such that a necessary current value is acquired by setting an inverter output voltage and inverter frequencies using voltage feedforward control without using current feedback control with respect to any LR load. In this test, a current value is misdetected in some cases, for example, due to misconnection or the like of motor phase current detecting sensors configured to detect a three-phase alternating current (AC) supplied from an inverter to a motor. In connection with this, when the motor phase current detecting sensors are misconnected, there is a method of detecting misconnection by detecting a current generated when the motor is rotated in reverse. However, the misconnection cannot be accurately detected at a time of an LR load in some cases.

The related art described above are disclosed in Japanese Patent Nos. 5081633 and 5331523 and Japanese Unexamined Patent Application, First Publication Nos. 2014-23282.

DETAILED DESCRIPTION

Figure 1:
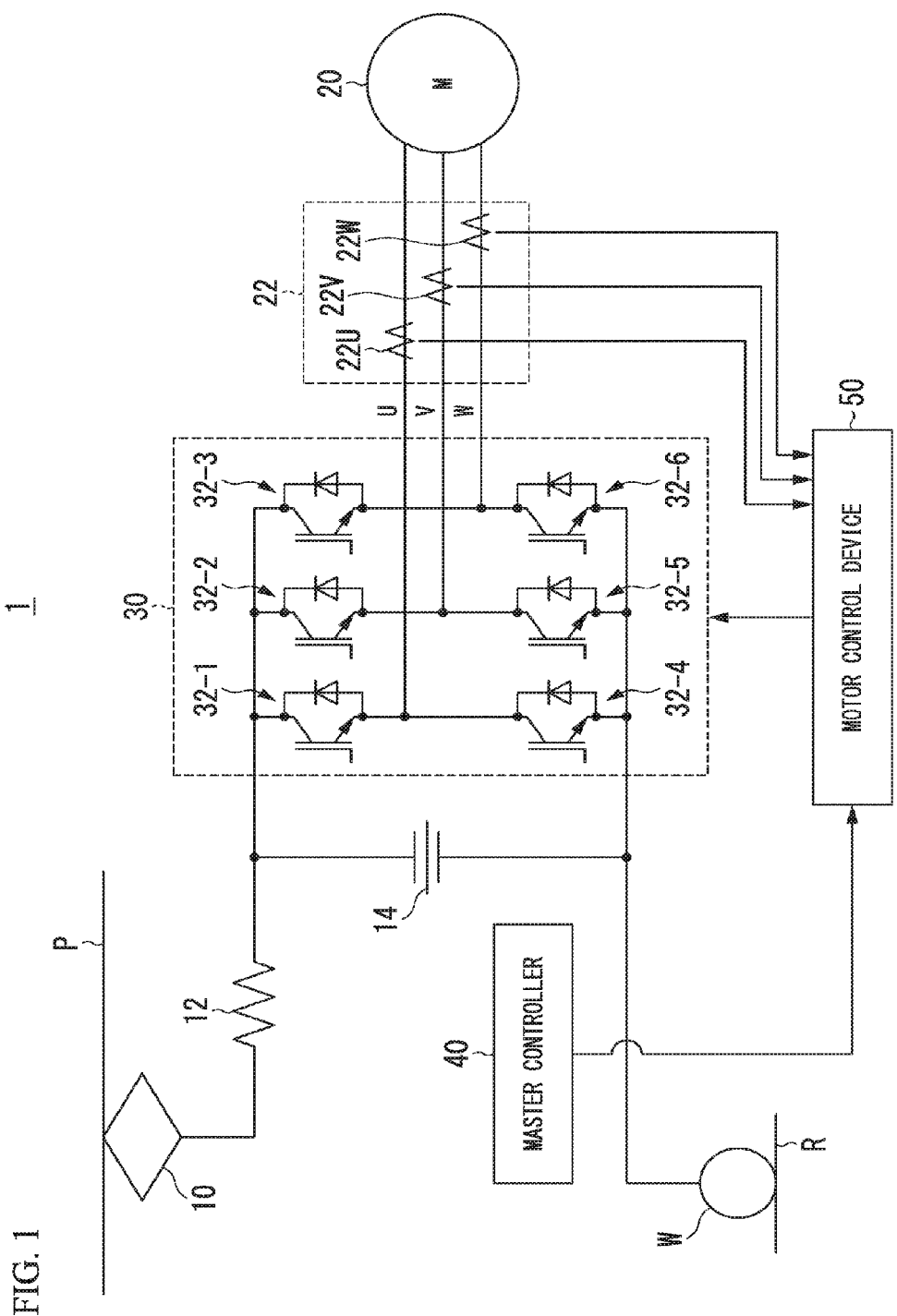
FIG. 1 is a view showing an overall constitution example of a vehicle driving device on which a motor control device is mounted.

In some embodiments, a motor control device may include, but is not limited to, a power inverter configured to convert input power for a motor into a three-phase alternating current; a phase converter configured to convert the three-phase alternating current into a two-phase alternating current having a d-axis current component and a q-axis current component; and a detector configured to detect a misconnection between current detectors which are each configured to detect the three-phase alternating current.

In some cases, the detector may be configured to compare an actually measured value of the two-phase alternating current and a command value of the two-phase alternating current, to detect the misconnection.

In other cases, the detector may include, but is not limited to, a code component separator, a code determiner, and a misconnection determiner. The code component separator separates code components representing polarities from actually measured values of the d-axis current component and the q-axis current component and from command values of the d-axis current component and the q-axis current component. The code determiner determines whether the code components with respect to the actually measured values of the d-axis current component and the q-axis current component, which are acquired by the code component separator correspond to code components for polarities of the command values of the d-axis current component and the q-axis current component, respectively. The misconnection determiner determines that the current detectors detect an abnormality of current due to a misconnection when the code determiner determines that the code components do not correspond to each other.

In other cases, the misconnection determiner is configured to detect no misconnection of the current detectors, even if the code components do not correspond to each other, when the actually measured values of the two-phase alternating current converted by the phase converter are equal to or less than a threshold value.

In other cases, the detector is configured to detect a maximum value and a minimum value from one or both of actually measured values of the d-axis current component and the a q-axis current component which are acquired by the phase converter to detect the misconnection, when polarities of the detected maximum and minimum values do not correspond to each other.

In other cases, the detector is configured to detect a maximum value and a minimum value from one or both of actually measured values of the d-axis current component and the a q-axis current component which are acquired by the phase converter to detect the misconnection, when a value obtained by integrating actually measured values of the two-phase alternating current converted by the phase converter on a time axis is equal to or less than a threshold value.

In other cases, the detector is configured to calculate a difference between the d-axis current component and the q-axis current component, which are included in the two-phase alternating current converted by the phase converter, and the detector is configured to detect the misconnection of the current detectors when a value obtained by integrating the difference calculated on the time axis is equal to or less than a threshold value.

In other cases, the detector is configured to detect a maximum value and a minimum value from one or both of actually measured values of the d-axis current component and the a q-axis current component which are acquired by the phase converter to detect the misconnection, when frequency components obtained by applying a Fourier transformation to actually measured values of the two-phase alternating current converted by the phase converter are approximately equal to multiples of frequencies of the power converter.

In some embodiments, a motor control method may include, but is not limited to: converting input power for a motor into a three-phase alternating current; converting the three-phase alternating current into a two-phase alternating current having a d-axis current component and a q-axis current component; and detecting a misconnection between current detectors which are each configured to detect the three-phase alternating current.

In other cases, detecting the misconnection may include, but is not limited to, comparing an actually measured value of the two-phase alternating current and a command value of the two-phase alternating current.

In other cases, detecting the misconnection may include, but is not limited to, separating code components representing polarities from actually measured values of the d-axis current component and the q-axis current component and from command values of the d-axis current component and the q-axis current component; determining whether the code components with respect to the actually measured values of the d-axis current component and the q-axis current component correspond to code components for polarities of the command values of the d-axis current component and the q-axis current component, respectively; and determining that an abnormality of current is detected due to the misconnection when it is determined that the code components do not correspond to each other.

In other cases, detecting the misconnection may include, but is not limited to, detecting no misconnection of the current detectors, even if the code components do not correspond to each other, when the actually measured values of the two-phase alternating current converted are equal to or less than a threshold value.

In other cases, detecting the misconnection may include, but is not limited to, detecting a maximum value and a minimum value from one or both of actually measured values of the d-axis current component and the a q-axis current component, when polarities of the detected maximum and minimum values do not correspond to each other.

In other cases, detecting the misconnection may include, but is not limited to, detecting a maximum value and a minimum value from one or both of actually measured values of the d-axis current component and the a q-axis current component to detect the misconnection, when a value obtained by integrating actually measured values of the two-phase alternating current converted on a time axis is equal to or less than a threshold value.

In other cases, detecting the misconnection may include, but is not limited to: calculating a difference between the d-axis current component and the q-axis current component, which are included in the two-phase alternating current converted; and detecting the misconnection of the current detectors when a value obtained by integrating the difference calculated on the time axis is equal to or less than a threshold value.

In other cases, detecting the misconnection may include, but is not limited to, detecting a maximum value and a minimum value from one or both of actually measured values of the d-axis current component and the a q-axis current component, when frequency components obtained by applying a Fourier transformation to actually measured values of the two-phase alternating current converted are approximately equal to multiples of power converter frequencies.

Hereinafter, a motor control device of embodiments will be described with reference to the drawings. Note that, in the following description, a vehicle driving device on which the motor control device is mounted will be described as an example, but a scope of application of the motor control device is not limited thereto.

FIG. 1 is a view showing an overall constitution example of the vehicle driving device on which the motor control device is mounted. For example, a vehicle driving device 1 shown in FIG. 1 is mounted on an electric vehicle such as a railway vehicle. A current collector 10 collies into contact with an overhead contact line P serving as a direct current (DC) power supply so that the electric vehicle receives power from the overhead contact line P and travels. The vehicle driving device 1 is provided with a motor (an induction motor) 20 which outputs a driving force for traveling, an inverter (a power converter) 30 which drives the motor 20, a master controller 40, and a motor control device 50 which controls the inverter 30 and drives the motor 20 as main component elements.

A power supply route from the current collector 10 is provided with a filter reactor 12. The filter reactor 12 smooths a current supplied from the overhead contact line P. Also, a filter condenser 14 is provided in parallel with the inverter 30 between the current collector 10 and a railroad R serving as a retrace cable. The filter condenser 14 stabilizes a voltage supplied to the inverter 30.

The motor 20 is, for example, a squirrel-cage induction motor. The motor 20 is connected to a wheel W via a connecting mechanism (not shown) such as a gear. Power lines for a U-phase, a V-phase, and a W-phase are connected to the motor 20. Current detectors (motor phase current detecting sensors) 22U, 22V, and 22W (in the following description, collectively referred to as a "motor phase current detecting sensor 22" according to necessity) are attached to the power lines for the U-phase, the V-phase, and the W-phase. Signals indicating detected values of the current detecting sensors are input to the motor control device 50.

The inverter 30 is provided with switching elements 32-1 to 32-6 which generate power of the U-phase. The switching elements are arbitrarily conducted (turned on)/block (turned off) so that the inverter 30 converts DC voltages into three-phase alternating current (AC) voltages of any voltage and any frequency. The switching elements are, for example, insulated gate bipolar transistors (IGBTs) in which diodes which are reversely connected in parallel with each other are built. Note that other types of switching elements may be used as the switching elements.

An operation of a vehicle on which the vehicle driving device 1 is mounted is performed, for example, by operating the master controller 40 attached to a driver's cab. Various aspects can be adopted as the master controller 40, but the master controller 40 is a horizontal axial type master controller which can instruct the vehicle to be braked/decelerated when being pressed forward and to be accelerated when being pulled rearward. A signal indicating an amount of operation which is performed on the master controller 40 or a control signal which is determined on the basis of the operation is input to the motor control device 50.

Also, the master controller 40 may have a function of performing input and output control of data on the motor control device 50 in, for example, an aging test of the motor control device 50 before shipping using an LR load or the like. In this case, the master controller 40 may transmit current commands for the testing to the motor control device 50 and drive or stop the motor 20 via the inverter 30 at a time of the aging test before shipping. In addition, when a signal indicating that a misconnection is detected is acquired from the motor control device 50, the master controller 40 may notify a tester of the misconnection by turning on an alarm lamp or stop current commands to the motor control device 50.

First Embodiment

Figure 2:
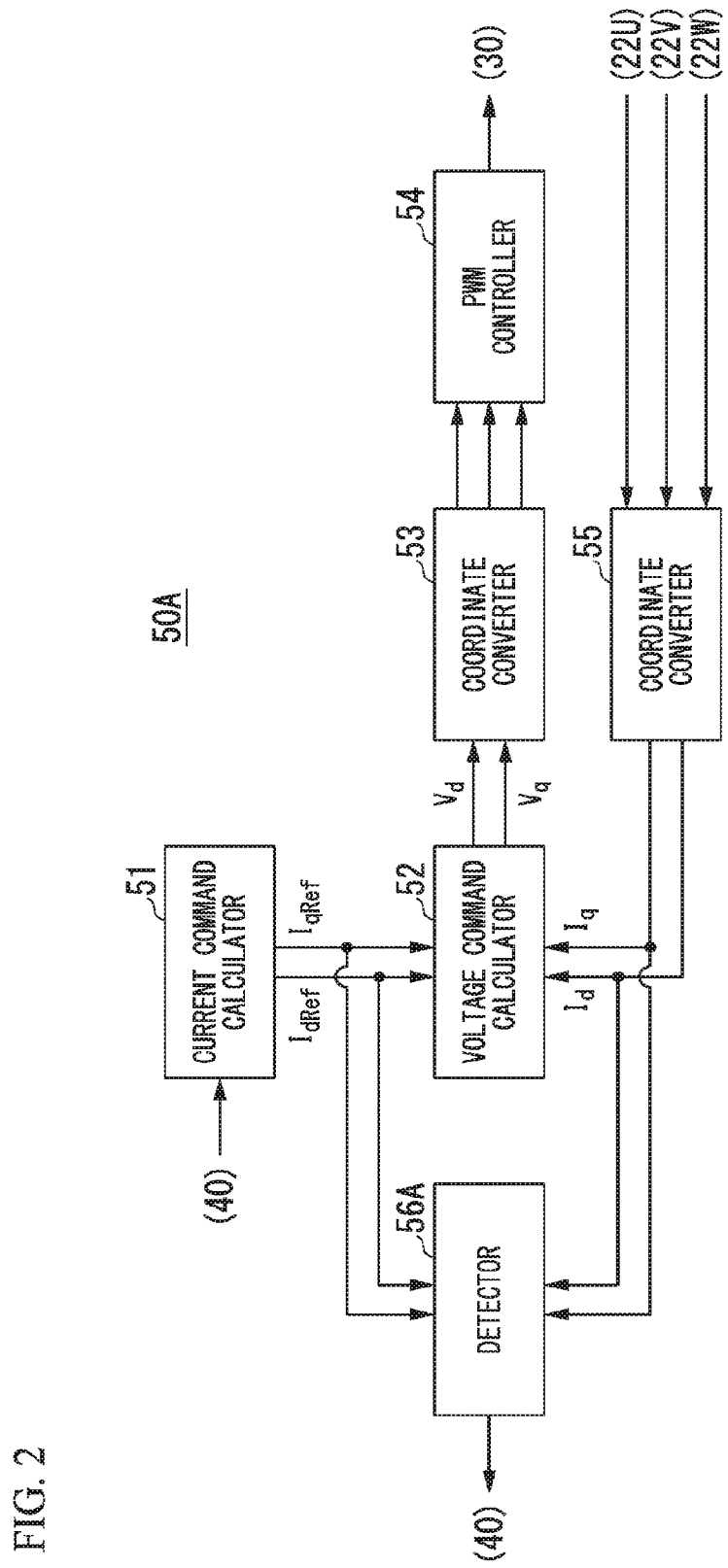
FIG. 2 is a view showing a functional constitution example of a motor control device 50A related to a first embodiment.

Next, a first embodiment of the motor control device 50 described above will be described using the drawings. FIG. 2 is a view showing a functional constitution example of a motor control device 50A related to the first embodiment. The motor control device 50A related to the first embodiment is provided with, for example, a current command calculator 51, a voltage command calculator 52, coordinate converters 53 and 55, a pulse width modulation (PWM) controller 54, and a detector 56A. These functional units are software functional units which function, for example, when a central processing unit (CPU) included in the motor control device (a computer) 50 executes a program. Also, all or some of the functional units shown in FIG. 2 may be hardware functional units such as a large scale integration (LSI) or an application specific integrated circuit (ASIC).

The current command calculator 51 generates a d-axis current component command IdRef and a q-axis current component command value IqRef on the basis of a signal or the like which is input from the master controller 40, and outputs the d-axis current component command IdRef and the q-axis current component command value IqRef to the voltage command calculator 52. Here, a d-axis current component is a current which flows in a direction of a secondary-side magnetic flux (a d-axis direction) of the motor 20, and a q-axis current component is a current which flows in a direction perpendicular to a d axis.

The voltage command calculator 52 generates a d-axis voltage command Vd and a q-axis voltage command Vq on the basis of the d-axis current component command IdRef and the q-axis current component command value IqRef which are input from the current command calculator 51 and a d-axis current component value Id and a q-axis current component value Iq which are input from the coordinate converter 55, and outputs the d-axis voltage command Vd and the q-axis voltage command Vq to the coordinate converter 53.

The coordinate converter 53 is a two-phase to three-phase converter (a phase converter) which converts the d-axis voltage command Vd and the q-axis voltage command Vq, which are input from the voltage command calculator 52, into voltage commands Vu, Vv, and Vw for the U-phase, the V-phase, and the W-phase, and outputs the voltage commands Vu, Vv, and Vw for the U-phase, the V-phase, and the W-phase to the PWM controller 54. The PWM controller 54 generates phase gate commands by comparing preset triangular waves with each of the phase voltage commands Vu, Vv, and Vw, and controls phase switching elements constituting the inverter 30 on the basis of the generated phase gate commands. The coordinate converter 55 is a three-phase to two-phase converter (a phase converter) which converts currents of the U-phase, the V-phase, and the W-phase, which are input from the motor phase current detecting sensors 22U, 22V, and 22W, into the d-axis current component value Id and the q-axis current component value Iq, and outputs the d-axis current component value Id and the q-axis current component value Iq to the voltage command calculator 52.

Here, mutual conversion between the d-axis and a q-axis, and the U-phase, the V-phase, and the W-phase will be described. For example, d-q-axis current component control serving as an example a control method of the inverter 30 can include detecting a three-phase AC supplied to the motor 20 from the inverter 30, and extracting an amount of DC current of the d-axis and the q-axis viewed at an angle θ at which the three-phase AC is rotated with the same phase. For example, when currents of the U-phase, the V-phase, and the W-phase are Iu, Iv, and Iw and currents of the d-axis and the q-axis are Id and Iq, a converting expression of these currents is represented by Expression (1).

$$\begin{bmatrix} i_d \\ i_q \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \cdot \begin{bmatrix} i_u \\ i_v \\ i_w \end{bmatrix} \quad (1)$$

When the d-axis current component value Id is calculated by substituting the U-phase and the W-phase from the converting expression represented by Expression (I), the result is represented by Expression (2).

$$i_d = -\sqrt{\frac{3}{2}} I \sin\left(2\theta - \frac{\pi}{3}\right) \quad (2)$$

In addition, for example, when a polarity of a detected current of the U-phase is reversed, the d-axis current component value Id is represented by Expression (3), where the polarity of current represents positive or negative of the current value.

$$i_d = -\sqrt{\frac{2}{3}} I \left(\sin 2\theta - \frac{1}{2}\right) \quad (3)$$

Here, when the motor phase current detecting sensor 22 is misconnected, d-q-axis current components (a two-phase alternating current of the d-axis current component and the q-axis current component) oscillate in about 2f components (components which are about two times inverter frequencies) with respect to any baseline (for example, zero (0)) based on Expression (2). Also, when a polarity of a detected current from the motor phase current detecting sensor 22 is reversed based on Expression (3), it can be seen that the d-q-axis current components oscillate in 2f components (frequencies which are two times the inverter frequencies) and has an offset.

Figure 3A:
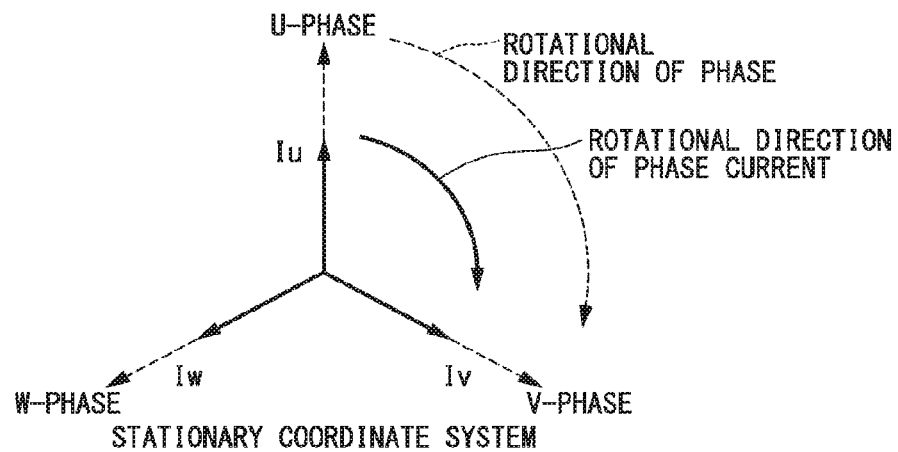
FIGS. 3A to 3C are views showing relationships between d-q-axis current components and a three-phase alternating current (AC) at a time of normal wiring.
Figure 3B:
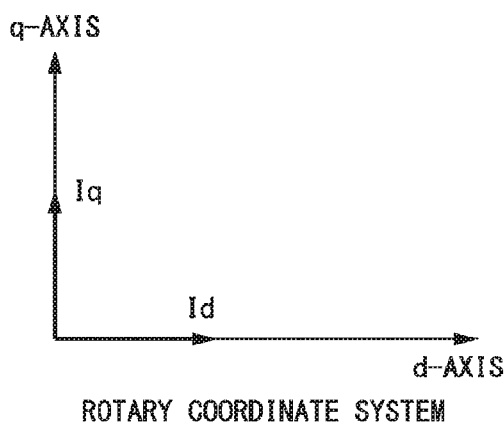
Figure 3C:
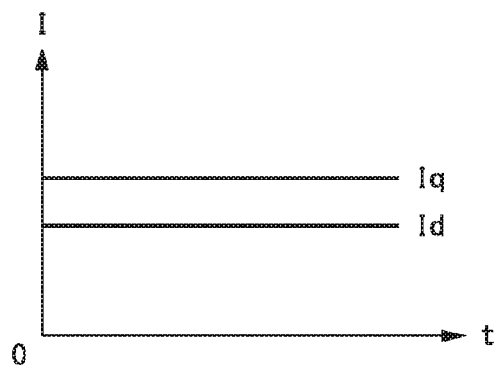
Figure 4A:
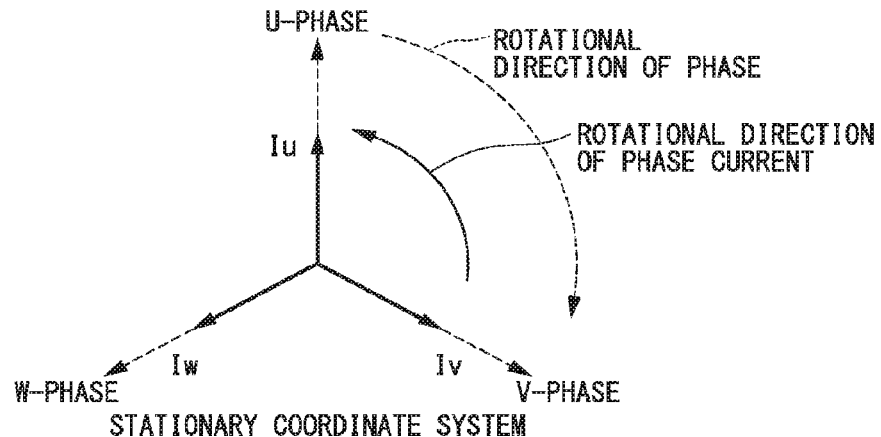
FIGS. 4A to 4C are views showing relationships between d-q-axis current components and a three-phase AC at a time of normal wiring.
Figure 4B:
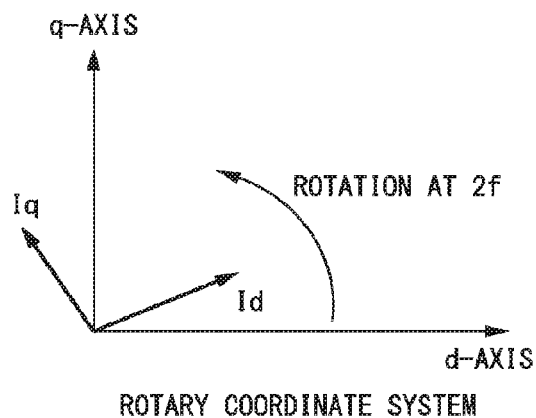
Figure 4C:
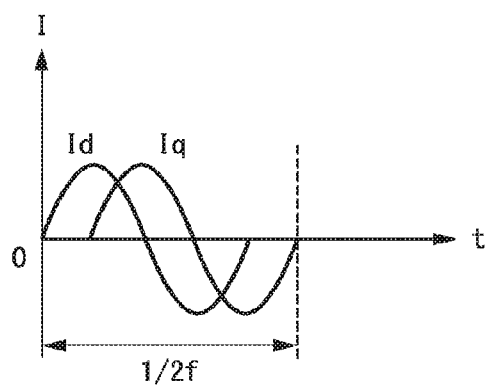

Here, FIGS. 3A to 3C are views showing relationships between the d-q-axis current components (the two-phase alternating current) and the three-phase AC at the time of normal wiring. FIGS. 4A to 4C are views showing relationships between the d-q-axis current components and the three-phase AC at the time of abnormal wiring. FIGS. 3A and 4A show stationary coordinate systems in three phases, and FIGS. 3B and 4B show rotary coordinate systems in d-q-axis. In addition, in FIGS. 3C and 4C, the horizontal axis indicates time t, the vertical axis indicates a current value I, and a temporal change of the d-q-axis current components (the d-axis current component and the q-axis current component) is shown. For example, in the stationary coordinate system at the time of normal wiring shown in FIG. 3A, rotational directions of phase currents coincide with rotational directions which are recognized by a control system (for example, frequency directions of the inverter 30). For this reason, after a d-q-axis converting process is performed on actually-measured phase current values, the d-q-axis current components have a relatively invariant relationship with the d-q-axis serving as the rotary coordinate system as shown in FIG. 3B. Therefore, as shown in FIG. 3C, the d-q-axis current components are regarded as an amount of DC in accordance with a temporal change of the d-q-axis current components as shown in FIG. 3C.

On the other hand, when the motor phase current detecting sensor 22 is misconnected, as shown in the stationary coordinate system of FIG. 4A, the rotational directions of the phase currents are opposite to the rotational directions (inverter frequency directions) which are recognized by the control system. For this reason, after the converting process to the d-q-axis is performed on the actually-measured phase current values, as shown in FIG. 4B, the d-q-axis current components relatively differ from each other in rotational speed by two times with respect to a d-q-axis serving as the rotary coordinate system as shown in FIG. 4B. Therefore, as shown in FIG. 4C, the d-q-axis current components are amounts of AC which oscillate in the 2f components in accordance with the temporal change of the d-q-axis current components as shown in FIG. 4C. This coincides with that of Expression (2) described above.

As shown in FIG. 4C, at the time of the misconnection, the d-q-axis current components oscillate in positive and negative with respect to a baseline (zero (0)). For this reason, in the first embodiment, a misconnection of the motor phase current detecting sensor 22 is detected using a polarity of the oscillation waveform. Note that, in the aging test of the inverter 30, d-q-axis current component values are given through feedforward control without performing feedback control. For this reason, the d-q-axis current component values are determined using the LR load (an inductance value and a resistance value).

Figure 5A:
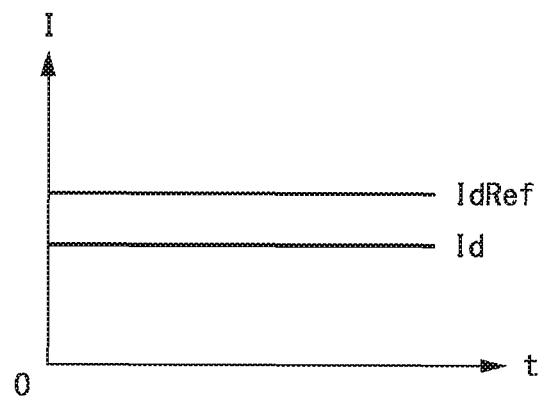
FIGS. 5A and 5B are views for describing relationships between d-q-axis current component command values and d-q-axis current component actually-measured values.
Figure 5B:
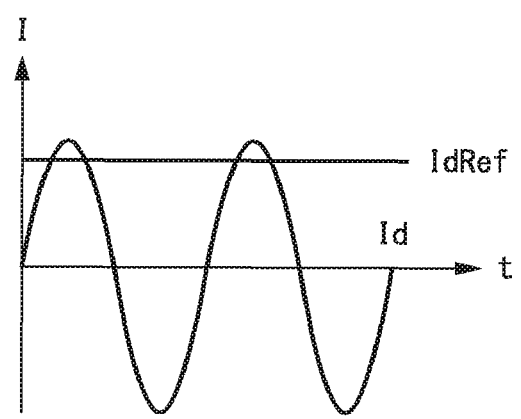

FIGS. 5A and 5B are views for describing relationships between d-q-axis current component command values and d-q-axis current component actually-measured values. Note that, in an example of FIGS. 5A and 5B, the horizontal axis indicates the time t, the vertical axis indicates a current value I, the command value IdRef and the actually-measured value Id of the d-axis current component are indicated, and the same applies to the q-axis current component. When the motor phase current detecting sensor 22 is normally wired, as shown in FIG. 5A, the d-q-axis current component command values correspond to the codes for polarities of the d-q-axis current component actually-measured values. On the other hand, when the motor phase current detecting sensor 22 is misconnected, as shown in FIG. 5B, actually-measured values of the d-q-axis current components oscillate in the 2f components of the inverter frequencies. For this reason, when the d-q-axis current component command values (IdRef and IqRef) do not correspond to the codes for polarities of the d-q-axis current component actually-measured values (Id and Iq), the detector 56A detects a misconnection of the motor phase current detecting sensor 22.

Figure 6:
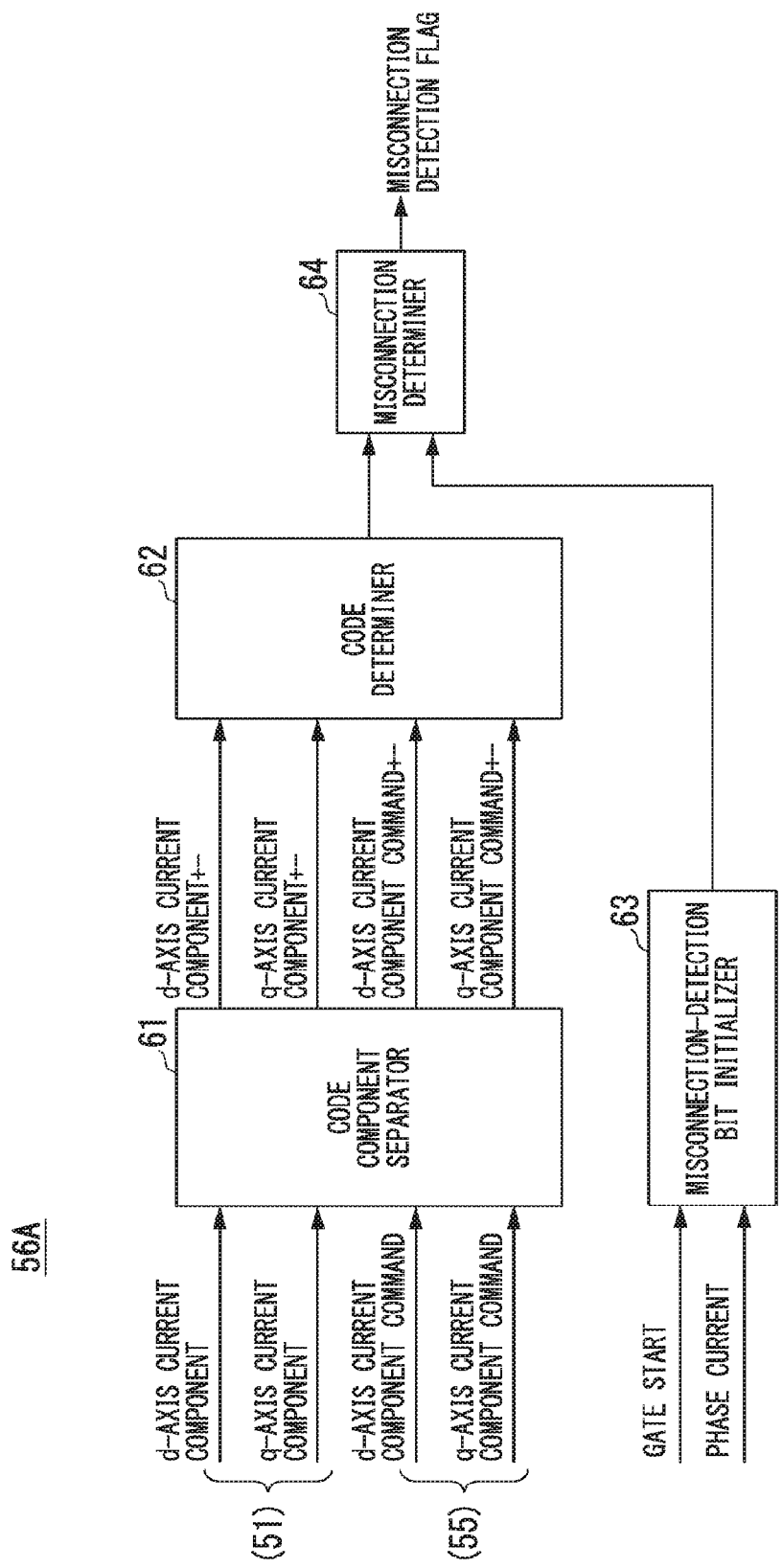
FIG. 6 is a view showing a functional constitution example of a detector according to the first embodiment.

FIG. 6 is a view showing a functional constitution example of the detector 56A related to the first embodiment. The detector 56A shown in FIG. 6 is provided with a code component separator 61, a code determiner 62, a misconnection detection bit initializer 63, and a misconnection determiner 64. The code component separator 61 separates the d-q-axis current components and the d-q-axis command values into positive (+) and negative (−) components. For example, the code component separator 61 separates the d-q-axis current components and the d-q-axis command values into the positive and negative components on the basis of content of predetermined code bits (for example, head bits) included in data of the d-q-axis current component command values IsRef and IqRef which are acquired from the current command calculator 51. For example, the d-q-axis current components and the d-q-axis command values are separated into the positive component when the head bit is 0 and are separated into the negative component when the head bit is 1.

Note that the code component separator 61 may perform calculation from data of a predetermined time unit (for example, a filter of about 1 second). Also, the code component separator 61 similarly performs separation of code components representing positive and negative components on the d-q-axis current component values Id and Iq which are acquired from the coordinate converter 55.

The code determiner 62 determines codes of the d-q-axis current component values (the actually-measured current values) and d-q current command values. For example, the code determiner 62 calculates exclusive OR (XOR) of code bits of positive and negative components of the d-q-axis current components and positive and negative components of the d-q-axis current components command. Thus, the calculated result is in an on state ("H" or "1") when the code bits differ from each other, and the calculated result is in an off state ("L" or "0") when the code bits are the same. Note that, when the on state continues for a predetermined time (for example, about 6 seconds), the code determiner 62 may output a signal of the on state to the misconnection determiner 64. For example, a code can be determined in a state in which a current is sufficiently raised by setting continuity of the predetermined time as a condition of on/off determination, and a misdetection when the current is raised can thus be prevented.

For example, when a gate is off or phase current values (actually-measured current values) are a threshold value or less (for example, 20 A or less), the misconnection detection bit initializer 63 outputs a signal (an off signal) obtained by performing initialization ("L" or "0") on a misconnection detection bit not to perform misconnection detection. Note that, when the misconnection detection bit is initialized, for example, all detection bits in a detecting algorithm are initialized. Also, when a gate starts or the phase current values exceed the threshold value, the misconnection detection bit initializer 63 outputs a signal (all on signal) obtained by setting the misconnection detection bit to be in the on state ("H" or "1") to the misconnection determiner 64. Thus, when the d-q-axis current component values (the actually-measured current values) are the threshold value or less, a misconnection of the motor phase current detecting sensor 22 cannot be detected even if code components for polarities do not correspond to each other. For example, even if codes of positive and negative components arc switched due to low currents (for example, 20 A or less) of the actually-measured current values when the motor phase current detecting sensor 22 is normally wired, it can be regarded as normal wiring without being determined as being a misconnection. Therefore, detection accuracy of the misconnection can be improved.

Also, the misconnection determiner 64 calculates a logical sum of a detection flag (the on/off signal) acquired by the code determiner 62 and an initialization flag of the misconnection detection bit initializer 63 and outputs a final misconnection detection flag.

Figure 7:
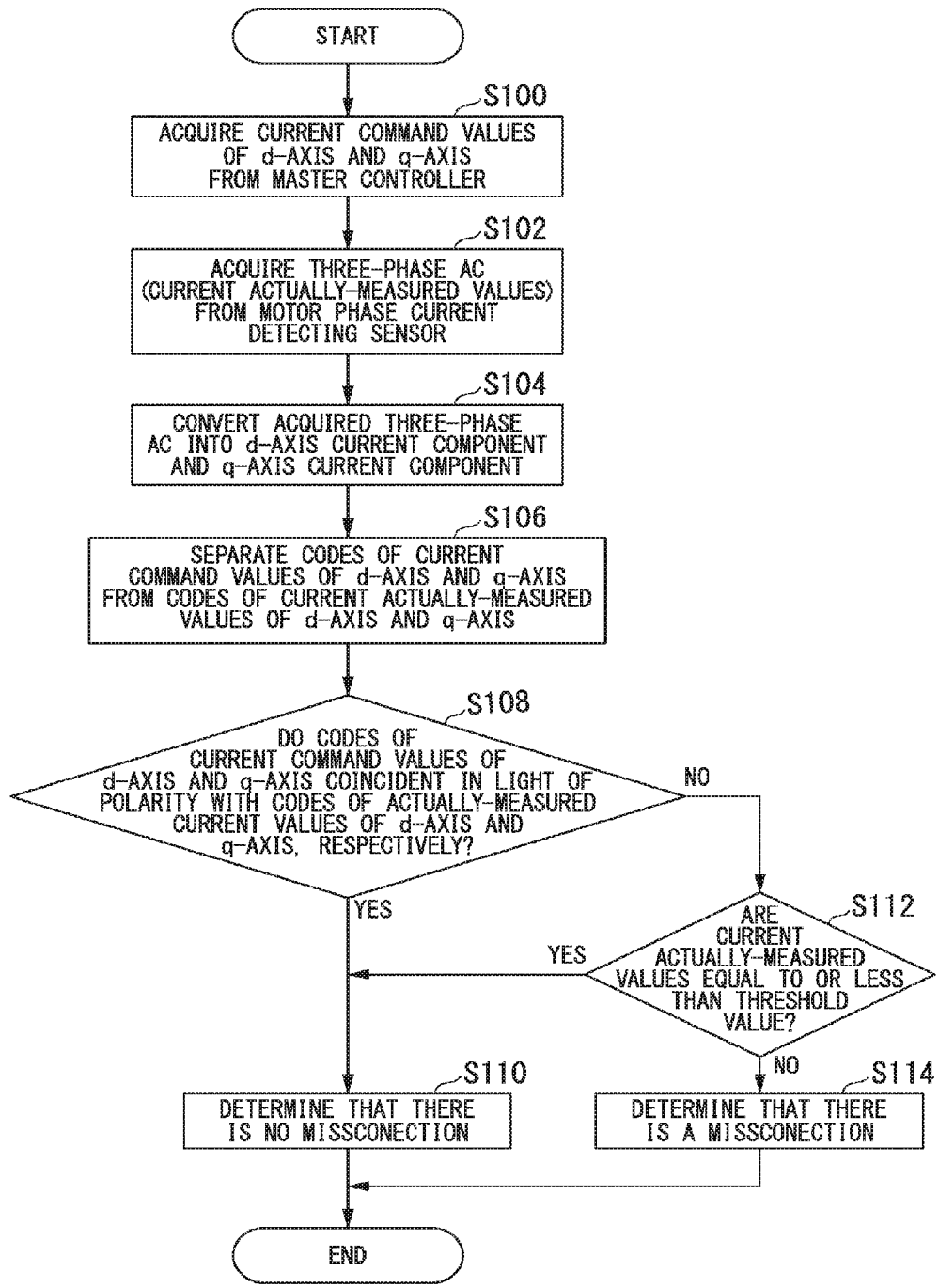
FIG. 7 is a flow chart illustrating an example of a misconnection detecting process according to the first embodiment.

Next, processing content of a case in which various processes related to the first embodiment described above are executed using a program which is installed in a computer of the motor control device 50A will be described using a flow chart. Note that, in the following description, a misconnection detecting process of the various processes which is executed by the motor control device 50A will be described. FIG. 7 is the flow chart illustrating an example of the misconnection detecting process related to the first embodiment.

In the example of FIG. 7, the detector 56A acquires current command values of a d-axis and a q-axis from the master controller 40 (Step S100), and acquires a three-phase AC (actually-measured current values), which is output from the inverter 30 to the motor 20 on the basis of the current command values, from the motor phase current detecting sensor 22 (Step S102). Subsequently, the detector 56A converts the acquired three-phase AC into a d-axis current component and a q-axis current component (Step S104), and separates codes (positive and negative components) of the current command values and the actually-measured current values of the d-axis and the q-axis (Step S106).

Subsequently, the detector 56A compeers in light of polarity codes of current command values of d-axis and q-axis with codes of actually-measured current values of d-axis and q-axis, respectively, and determines whether or not the codes of the current command values of d-axis and q-axis coincident in light of polarity with the codes of actually-measured current values of d-axis and q-axis, respectively (Step S108). When the detector 56A determines that the codes of the current command values of d-axis and q-axis coincident in light of polarity with the codes of actually-measured current values of d-axis and q-axis, respectively, the detector 56A determines that there is no misconnection (Step S110). When the detector 56A determines that at least one of the codes of the current command values of d-axis and q-axis does not coincident in light of polarity with at least a respective one of the codes of actually-measured current values of d-axis and q-axis, the detector 56A determines whether or not the actually-measured current values are equal to or less than the threshold value (Step S112). When the detector 56A determines that the actually-measured current values are equal to or less than the threshold value, the detector 56A determines that there is no misconnection (Step S110). Also, when the detector 56A determines that the actually-measured current values are more than the threshold value, the detector 56A determines that there is a misconnection (Step S114).

As described above, according to the first embodiment, for example, d-q-axis current components after three-phase to two-phase conversion is performed on phase currents are compared with command values, and when the d-q-axis current components and the command values have reverse polarities, a misconnection such as a misconnection of the motor phase current detecting sensor 22 at a time of the aging test of the inverter 30 (at a time of an LR load) (for example, a U-phase and a W-phase passing each other, the U-phase and a V-phase passing each other, and the V-phase and the W-phase passing each other) is detected. Thus, detection accuracy of the misconnection can be improved.

Note that the detector 56A may be used in an aging test before shipping of the inverter 30 or the motor 20, and there is no need to perform the aging test as long as a special event such as an exchange of a device or a connecting line is not generated after shipping. Therefore, the detector 56A may be decoupled from the motor control device 50A after the aging test, and a switching unit may be provided such that d-q-axis current components actually-measured values from the coordinate converter 55 and d-q-axis current components command values from the current command calculator 51 are not input to the detector 56A.

Second Embodiment

Figure 8:
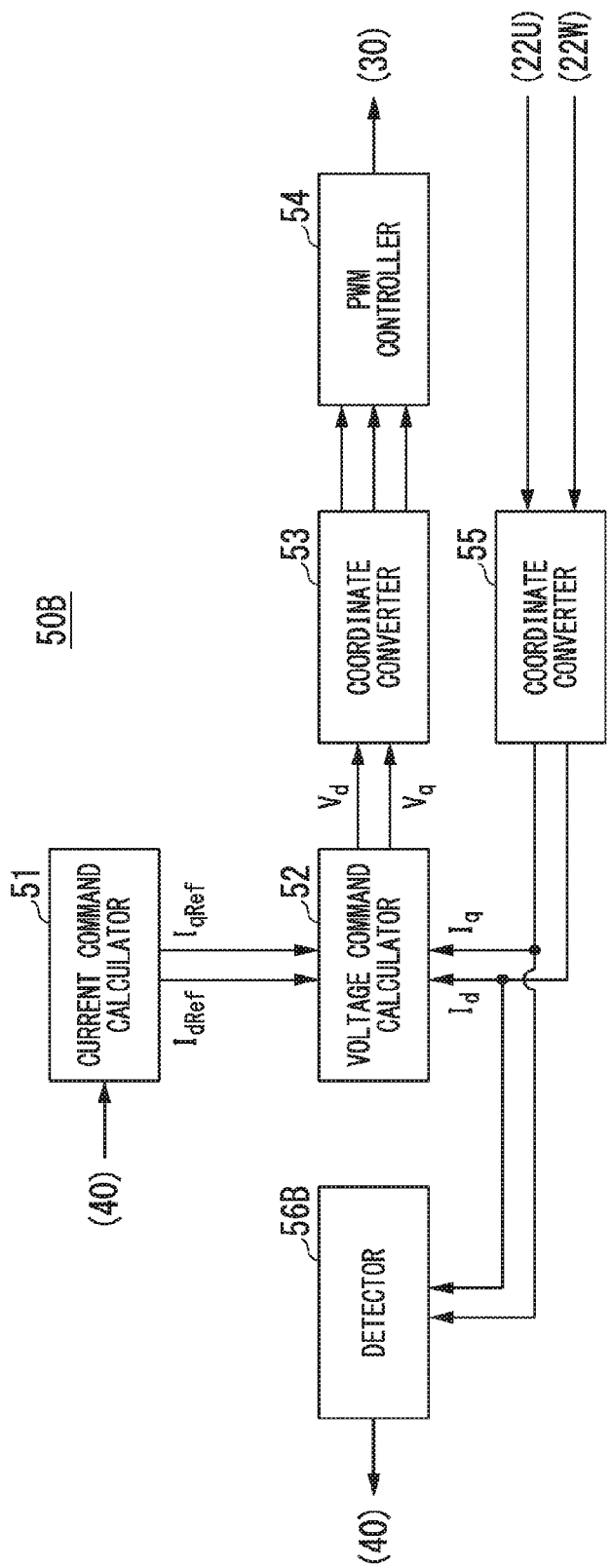
FIG. 8 is a view showing a functional constitution example of a motor control device according to a second embodiment.

Next, a second embodiment of misconnection detection will be described using the drawings. FIG. 8 is a view showing a functional constitution example of a motor control device 50B related to the second embodiment. The motor control device 50B related to the second embodiment is provided with, for example, a current command calculator 51, a voltage command calculator 52, coordinate converters 53 and 55, a PWM controller 54, and a detector 56B. Here, comparing the second embodiment with the above-described first embodiment, information input to the detector 56B includes actually-measured current values Id and Iq of d-q-axis current components, and current command values IdRef and IqRef are not input. Note that, in the second embodiment, since a constitution other than the detector 56B is the same as the constitution illustrated in the first embodiment, overlapping description will be omitted herein.

Figure 9:
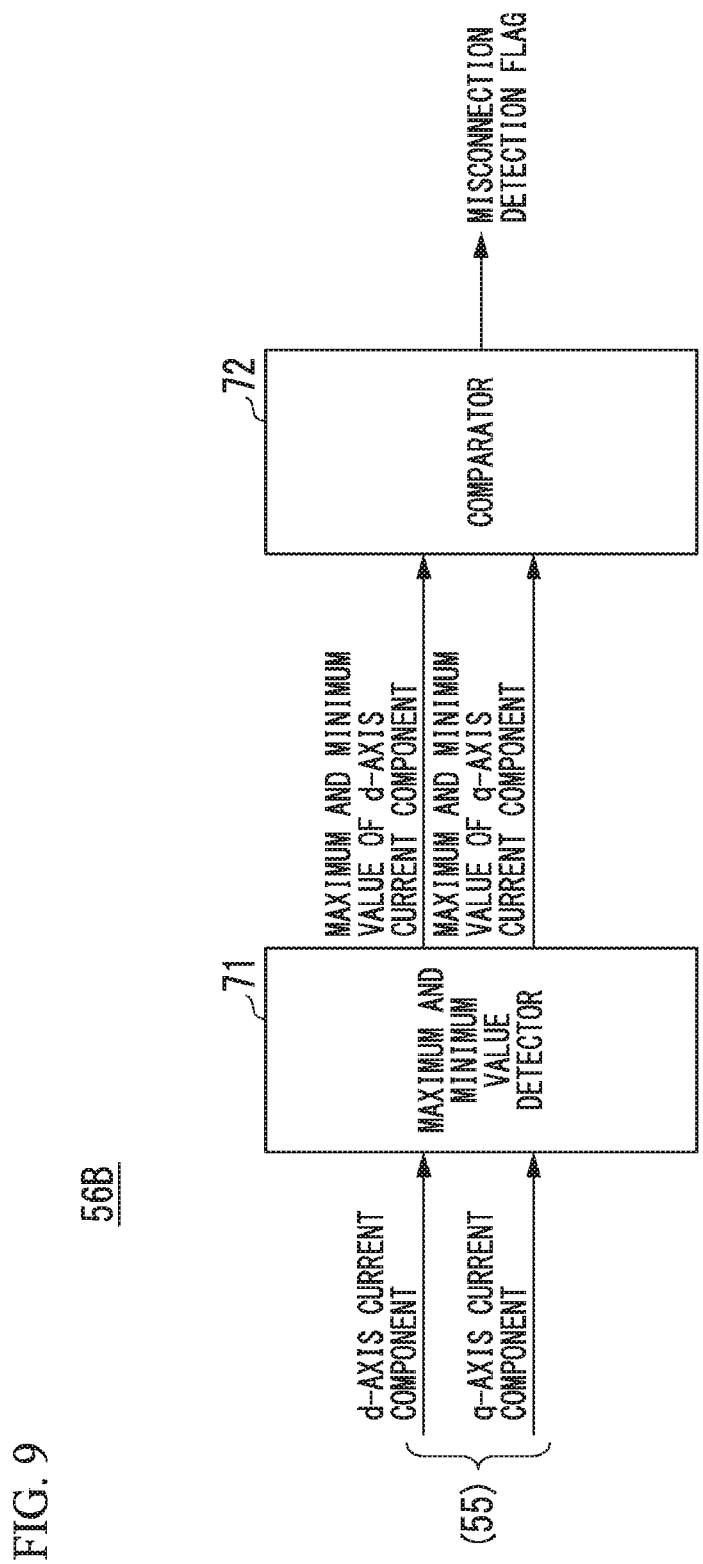
FIG. 9 is a view showing a functional constitution example of a detector according to the second embodiment.

FIG. 9 is a view showing a functional constitution example of the detector 56B related to the second embodiment. The detector 56B shown in the example of FIG. 9 is provided with a maximum value and minimum value detector 71, a comparator 72, a misconnection detection bit initializer 63, and a misconnection determiner 64. The maximum and minimum value detector 71 acquires actually-measured values Id and Iq of the d-q-axis current components acquired from the coordinate converter 55 at a preset interval (for example, corresponding to 2 and 3 wavelength periods), and outputs a maximum value and a minimum value of the d-axis current component or the q-axis current component in this interval or a maximum value and a minimum value of the q-axis current component to the comparator 72.

The comparator 72 compares, in polarity, the maximum value and the minimum value of the d-axis current component with the maximum value and the minimum value of the q-axis current component, respectively. If the polarities differ from each other in at least one of respective comparisons of the maximum values and the minimum values, then the comparator 72 supplies, to a master controller 40 for notification of misconnection, a flag (a misconnection detection flag) indicating that the comparator 72 determined misconnection between the current detectors 22 configured to detect the three-phase alternating current.

Note that, in the second embodiment, as illustrated in the first embodiment described above, the detector 56B may be provided with a misconnection detection bit initializer 63 and a misconnection determiner 64. In this case, the misconnection determiner 64 may perform a final misconnection determination using a compared result acquired from the comparator 72 and information acquired from the misconnection detection bit initializer 63. Thus, even if codes of positive and negative components are switched due to a low current, it can be regarded as a normal wiring without being determined to be a misconnection. Therefore, detection accuracy of the misconnection can be improved.

Figure 10:
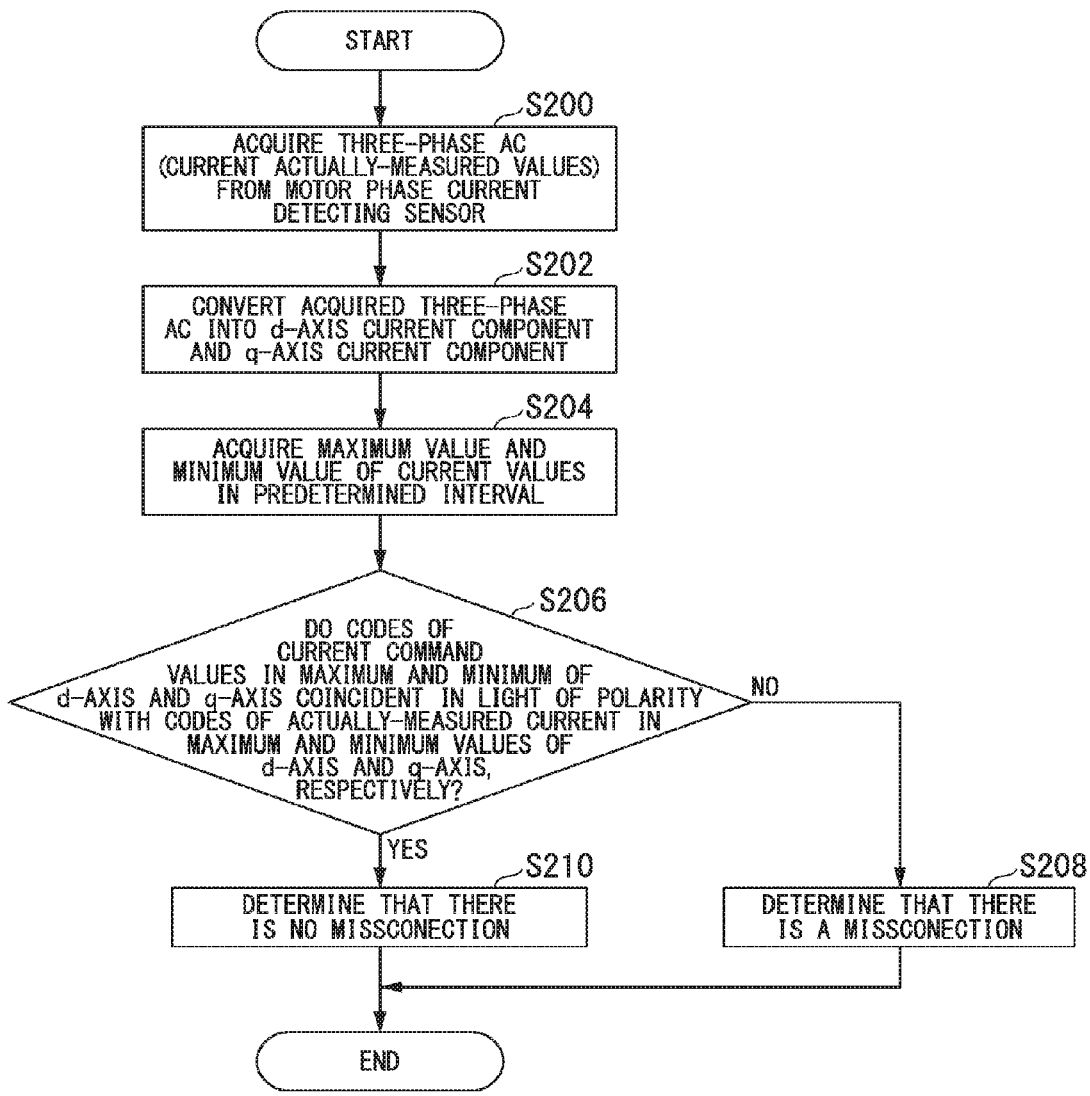
FIG. 10 is a flow chart illustrating an example of a misconnection detecting process according to the second embodiment.

Next, content of a misconnection detecting process related to the second embodiment described above will be described using a flow chart. FIG. 10 is a flow chart illustrating an example of a misconnection detecting process related to the second embodiment.

In the example of FIG. 10, the detector 56B acquires a three-phase AC (actually-measured current values), which is output from an inverter 30, from a motor phase current detecting sensor 22 (Step S200). Subsequently, the detector 56B converts the acquired three-phase AC into a d-axis current component and a q-axis current component (Step S202), and acquires a maximum value and a minimum value of one or both of the d-axis current component and the q-axis current component at a predetermined interval (Step S204). Subsequently, the detector 56B determines whether or not the codes of the current command values of d-axis and q-axis coincident in light of maximum and minimum values with the codes of actually-measured current values of d-axis and q-axis, respectively (Step S206). When the detector 56B determines that at least one of the codes of the current command values of d-axis and q-axis does not coincident in light of at least one of maximum and minimum values with a respective one of the codes of actually-measured current values of d-axis and q-axis, the detector 56B determines that there is a misconnection (Step S208). When the detector 56B determines that the codes of the current command values of d-axis and q-axis coincident in light of maximum and minimum values with the codes of actually-measured current values of d-axis and q-axis, the detector 56B determines that there is no misconnection (Step S210).

As described above, according to the second embodiment, when the motor phase current detecting sensor 22 is misconnected, d-q currents oscillate in about a 2f components. Thus, for example, the maximum value and the minimum value of the d-q-axis current components are acquired, and a misconnection such as a misconnection can thus be detected when the codes for polarities of the values do not correspond to each other. Thus, for example, the misconnection of the motor phase current detecting sensor 22 in the aging test of the inverter 30 (at a time of the LR load) or the like can be accurately detected. Note that the detector 56B may be decoupled from the motor control device 50B after the aging test, and a switching unit may be provided such that the d-q-axis current components actually-measured values from the coordinate converter 55 are not input to the detector 56B.

Third Embodiment

A third embodiment of misconnection detection will be described using the drawings. In the third embodiment, misconnection in the motor phase current detecting sensor 22 can cause the motor phase current detecting sensor 22 to oscillate at the 2f component of inverter frequency of the inverter 30, thereby causing a current waveform to cross a baseline, and causing the integrated value of the current to approach 0 upon integration. Thus, the integrated values equal to or less than a threshold value represents that the motor phase current detecting sensor 22 is misconnected. The same function and configuration as the motor control device 50B according to the above-described second embodiment can be applied in the third embodiment. Duplicate descriptions made in the second embodiment will be omitted in the third embodiment.

Figure 11:
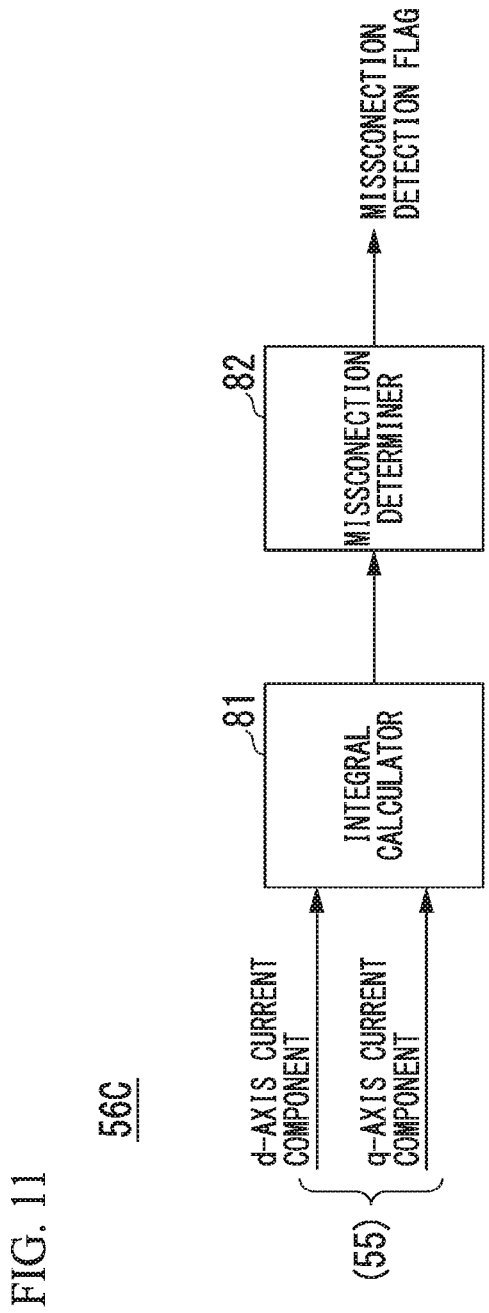
FIG. 11 is a view showing a functional constitution example of a detector according to a third embodiment.

FIG. 11 is a view showing a functional constitution example of a detector 56C related to the third embodiment. The detector 56C shown in FIG. 11 is a replacement for the detector 56B in FIG. 8 which is described above. The detector 56C shown in FIG. 11 is provided with an integral calculator 81 and a misconnection determiner 82. The integral calculator 81 integrates actually measured values of one or both of a d-axis current component and a q-axis current component which are converted by a coordinate converter 55 on a time axis. Note that the integral calculator 81 may calculate a difference between the d-axis current component and the q-axis current component which are converted by the coordinate converter 55 and integrate a difference value thereof on the time axis. Also, the integral calculator 81 may acquire actually measured values of one or both of the d-axis current component and the q-axis current component by applying a slow filter of about 1 second.

When values which are integrated by the integral calculator 81 are within, for example, a threshold value (for example, 20 A) of about 0, the misconnection determiner 82 determines that a motor phase current detecting sensor 22 is misconnected, and a flag indicating the fact that the motor phase current detecting sensor 22 is misconnected (a misconnection detection flag) is output to a master controller 40 so that notification of misconnection is given.

In addition, when the misconnection determiner 82 already acquires information of integrated values, for example, at a time of normal wiring, it may be determined to be a misconnection when the above-described integrated values are compared with this information and a difference is a predetermined value or more. Also, when d-q current component waveforms have respectively predetermined offset values without oscillating using 0 as a baseline, the misconnection determiner 82 may determine that there is a misconnection when the values which are integrated by the integral calculator 81 are within the threshold value near the above-described offset value. For example, the threshold value is about ⅜ to ⅝ when the offset value is ½, but the present invention is not limited thereto.

Figure 12:
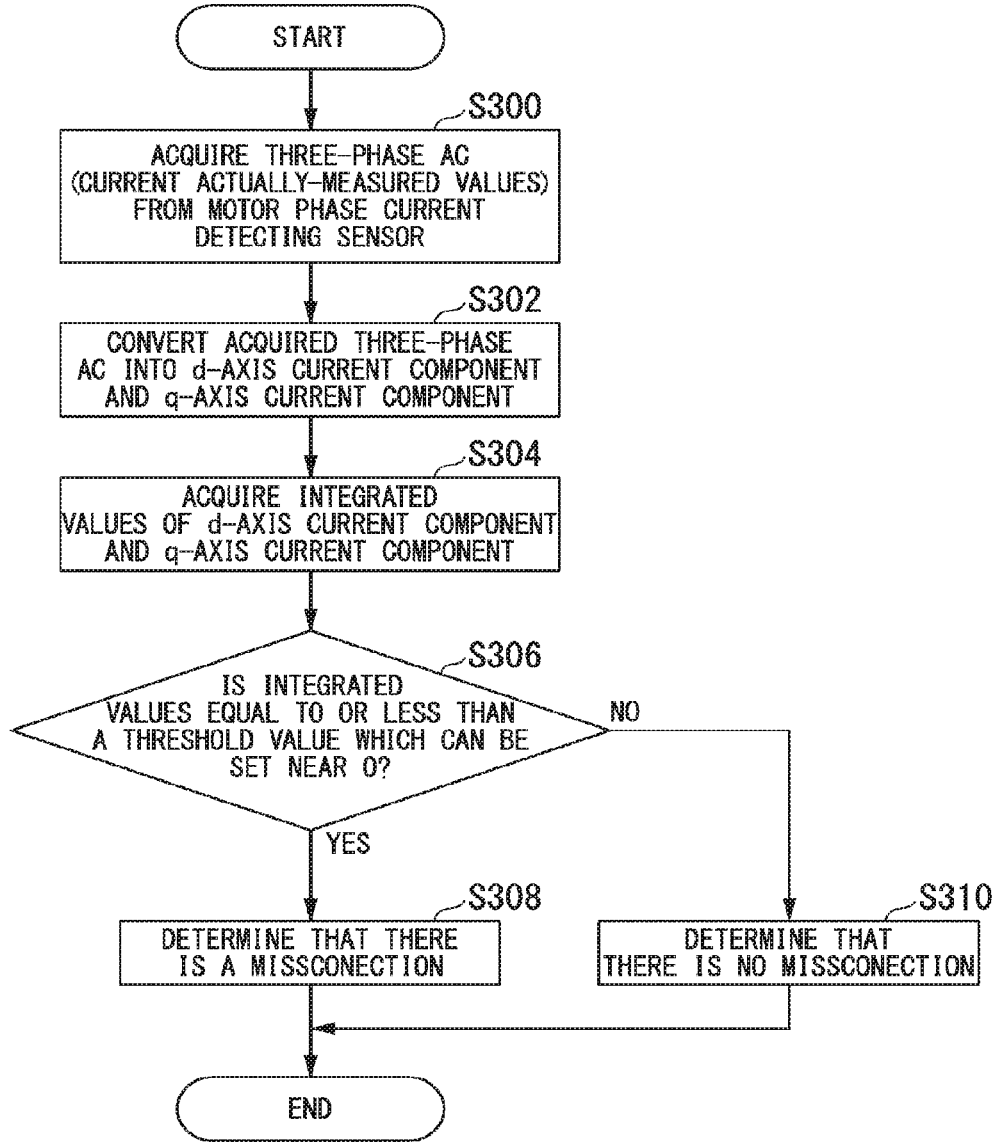
FIG. 12 is a flow chart illustrating an example of a misconnection detecting process according to the third embodiment.

Next, content of a misconnection detecting process related to the third embodiment described above will be described using a flow chart. FIG. 12 is a flow chart illustrating an example of the misconnection detecting process related to the third embodiment.

In the example of FIG. 12, the detector 56C acquires a three-phase AC (actually-measured current values), which is output from an inverter 30, from the motor phase current detecting sensor 22 (Step S300). Subsequently, the detector 56C converts the acquired three-phase AC into a d-axis current component and a q-axis current component (Step S302), and acquires integrated values by integrating actually measured values of the d-axis current component and the q-axis current component on a time axis, respectively (Step S304). Subsequently, the detector 56C determines whether each of the acquired integrated values is equal to or less than a threshold value which can be set near 0 (Step S306). The threshold value can be set manually or optionally by a person having ordinary skills in the art to which the third embodiment pertains. When the detector 56C determines that at least one of the integrated values is equal to or less than the threshold value, the detector 56C determines that there is a misconnection in the motor phase current detecting sensor 22 (Step S308). Also, when the detector 56C determines that the integrated values are all more than the threshold value, the detector 56C determines that there is no misconnection in the motor phase current detecting sensor 22 (Step S310).

As described above, according to the third embodiment, when there is a misconnection in the motor phase current detecting sensor 22, the d-q currents oscillate at about the 2f components. Thus, abnormality regarding connection such as misconnection can be detected, for example, when the integrated values of the d-q-axis current components are within a threshold value near a predetermined value. Therefore, the misconnection of the motor phase current detecting sensor 22, for example, at a time of an aging test of the inverter 30 (at a time of an LR load) or the like can be accurately detected. Note that the detector 56C may be decoupled from the motor control device 50B after the aging test, and a switching unit may be provided such that the d-q-axis current components actually-measured values from the coordinate converter 55 are not input to the detector 56C.

Fourth Embodiment

Next, a fourth embodiment of misconnection detection will be described using the drawings. In the fourth embodiment, when frequency components are acquired by performing a Fourier transform (for example, a fast Fourier transform (FFT)) on d-q-axis current components command values $I_d$ and $I_q$ which are acquired from a coordinate converter 55, and main components of the acquired frequency components are components which are a predetermined multiple of a frequency in an inverter 30 (a frequency of a driving signal used to drive the inverter 30), a misconnection of motor phase current detecting sensors is detected. Note that, since the same functional constitution as the motor control device 50B related to the above-described second embodiment can be applied in the fourth embodiment, a specific description herein will be omitted.

Figure 13:
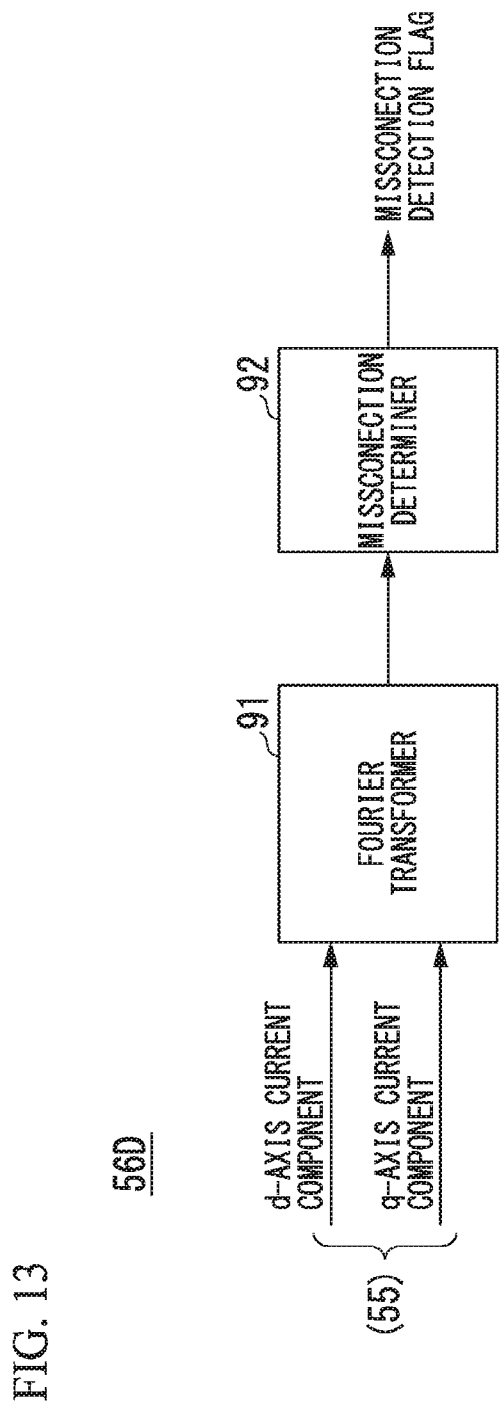
FIG. 13 is a view showing a functional constitution example of a detector according to a fourth embodiment.

FIG. 13 is a view showing a functional constitution example of a detector 56D related to the fourth embodiment. The detector 56D shown in FIG. 13 is a replacement of the detector 56B in FIG. 8 which is described above. The detector 56D shown in an example of FIG. 13 is provided with a Fourier transformer 91 and a misconnection determiner 92. The Fourier transformer 91 acquires frequency components by performing an FFT or the like on actually-measured values Id and Iq of a d-axis current component and a q-axis current component which are acquired from the coordinate converter 55 and outputs the frequency components to the misconnection determiner 92. Note that a method of acquiring the frequency components is not limited to a FFT. When the frequency components are components which are a predetermined multiple of inverter frequencies (for example, about two times) on the basis of an input converted result, the misconnection determiner 92 determines that a motor phase current detecting sensor 22 is misconnected, and a flag indicating the fact that the motor phase current detecting sensor 22 is misconnected (a misconnection detection flag) is output to a master controller 40 so that notification of misconnection is given.

Figure 14:
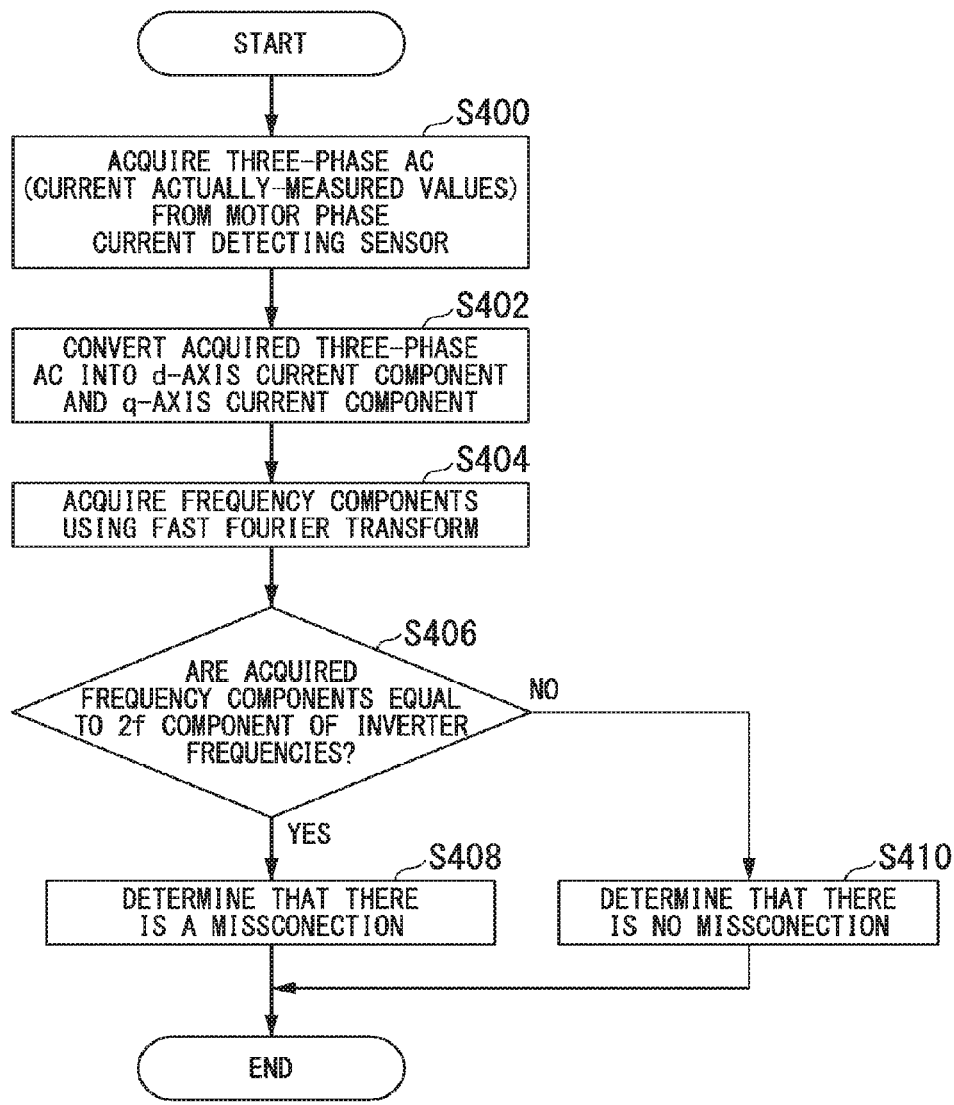
FIG. 14 is a flow chart illustrating an example of a misconnection detecting process related to the fourth embodiment.

Next, content of a misconnection detecting process related to the fourth embodiment described above will be described using a flow chart. FIG. 14 is a flow chart illustrating an example of the misconnection detecting process related to the fourth embodiment.

In the example of FIG. 14, the detector 56D acquires a three-phase AC (actually-measured current values), which is output from the inverter 30, from the motor phase current detecting sensor 22 (Step S400). Subsequently, the detector 56D converts the acquired three-phase AC into a d-axis current component and a q-axis current component (Step S402), and acquires frequency components by performing an FFT or the like on actually measured values of the d-axis current component and the q-axis current component (Step S404).

Subsequently, the detector 56D determines whether the acquired frequency components are 2f components of inverter frequencies (Step S406). Note that numerical values (2f frequencies) of compared targets in Step S406 may include a predetermined permissible range (for example, 1.8f to 2.2f).

Also, the detector 56D may acquires main frequency components by applying a predetermined band pass filter or the like to the acquired frequency components and determine whether the acquired main frequency components are 2f components of inverter frequencies.

When the acquired frequency components are the 2f components of the inverter frequencies, the detector 56D determines that there is a misconnection (Step S408). In addition, when the acquired frequency components are not the 2f components of the inverter frequencies, the detector 56D determines that there is no misconnection (Step S410).

As described above, according to the fourth embodiment, for example, when the motor phase current detecting sensor 22 was misconnected, d-q currents vibrate in about 2f components. Thus, peaks of frequency components with respect to the d-q-axis current components are 2f components, and a misconnection such as a misconnection can be detected. Thus, the misconnection of the motor phase current detecting sensor 22, for example, at a time of an aging test of the inverter 30 (at the time of the LR load) or the like can be accurately detected. Note that the detector 56D may be decoupled from the motor control device 50B after the aging test, and a switching unit may be provided such that the d-q-axis current components actually-measured values from the coordinate converter 55 are not input to the detector 56D. The above-described the first to fourth embodiments may be combined with all or some of at least another embodiment.

According to at least one of the above-described embodiments, the inverter 30 which converts input power into a three-phase AC and supplies the three-phase AC to the motor 20, a phase converter (the coordinate converter 55) which converts the three-phase AC supplied from the inverter 30 to the motor 20 into a two-phase alternating current of a d-axis current component and a q-axis current component, and a detector 56 which detects a misconnection of the motor phase current detecting sensor 22 by comparing polarities of actually measured values of the converted two-phase alternating current and command values of the two-phase alternating current are provided so that detection accuracy of the misconnection can be improved.

Some embodiments of the present invention have been described, but the embodiments are presented as examples and are not intended to limit the scope of the present invention. The embodiments can be carried out in various other forms, and various omissions, replacements, and changes are possible without departing from the gist of the present invention. The embodiments and modifications thereof are included in the range and the gist of the present invention and are included in the invention disclosed in the claims and the range equivalent thereto.

What is claimed is:

1. A motor control device comprising:
   a power inverter configured to convert input power for a motor into a three-phase alternating current;
   a phase converter configured to convert the three-phase alternating current into a two-phase alternating current having a d-axis current component and a q-axis current component; and
   a detector configured to detect a misconnection between current detectors which are each configured to detect the three-phase alternating current.

2. The motor control device according to claim 1, wherein the detector is configured to compare an actually measured value of the two-phase alternating current and a command value of the two-phase alternating current, to detect the misconnection.

3. The motor control device according to claim 1, wherein the detector comprises:
   a code component separator which separates code components representing polarities from actually measured values of the d-axis current component and the q-axis current component and from command values of the d-axis current component and the q-axis current component;
   a code determiner which determines whether the code components with respect to the actually measured values of the d-axis current component and the q-axis current component, which are acquired by the code component separator correspond to code components for polarities of the command values of the d-axis current component and the q-axis current component, respectively; and
   a misconnection determiner which determines that the current detectors detect an abnormality of current due to a misconnection when the code determiner determines that the code components do not correspond to each other.

4. The motor control device according to claim 3, wherein the misconnection determiner is configured to detect no misconnection of the current detectors, even if the code components do not correspond to each other, when the actually measured values of the two-phase alternating current converted by the phase converter are equal to or less than a threshold value.

5. The motor control device according to claim 1, wherein the detector is configured to detect a maximum value and a minimum value from one or both of actually measured values of the d-axis current component and the a q-axis current component which are acquired by the phase converter to detect the misconnection, when polarities of the detected maximum and minimum values do not correspond to each other.

6. The motor control device according to claim 1, wherein the detector is configured to detect a maximum value and a minimum value from one or both of actually measured values of the d-axis current component and the a q-axis current component which are acquired by the phase converter to detect the misconnection, when a value obtained by integrating actually measured values of the two-phase alternating current converted by the phase converter on a time axis is equal to or less than a threshold value.

7. The motor control device according to claim 6, wherein the detector is configured to calculate a difference between the d-axis current component and the q-axis current component, which are included in the two-phase alternating current converted by the phase converter, and the detector is configured to detect the misconnection of the current detectors when a value obtained by integrating the difference calculated on the time axis is equal to or less than a threshold value.

8. The motor control device according to claim 1, wherein the detector is configured to detect a maximum value and a minimum value from one or both of actually measured values of the d-axis current component and the a q-axis current component which are acquired by the phase converter to detect the misconnection, when frequency components obtained by applying a Fourier transformation to actually measured values of the two-phase alternating current converted by the phase converter are approximately equal to multiples of frequencies of the power converter.

9. A motor control method comprising:
   converting input power for a motor into a three-phase alternating current;
   converting the three-phase alternating current into a two-phase alternating current having a d-axis current component and a q-axis current component; and
   detecting a misconnection between current detectors which are each configured to detect the three-phase alternating current.

10. The motor control device according to claim 9, wherein detecting the misconnection comprises comparing an actually measured value of the two-phase alternating current and a command value of the two-phase alternating current.

11. The motor control method according to claim 9, wherein detecting the misconnection comprises:
    separating code components representing polarities from actually measured values of the d-axis current component and the q-axis current component and from command values of the d-axis current component and the q-axis current component;
    determining whether the code components with respect to the actually measured values of the d-axis current component and the q-axis current component correspond to code components for polarities of the command values of the d-axis current component and the q-axis current component, respectively; and
    determining that an abnormality of current is detected due to the misconnection when it is determined that the code components do not correspond to each other.

12. The motor control method according to claim 11, wherein detecting the misconnection comprises detecting no misconnection of the current detectors, even if the code components do not correspond to each other, when the actually measured values of the two-phase alternating current converted are equal to or less than a threshold value.

13. The motor control method according to claim 9, wherein detecting the misconnection comprises detecting a maximum value and a minimum value from one or both of actually measured values of the d-axis current component and the a q-axis current component, when polarities of the detected maximum and minimum values do not correspond to each other.

14. The motor control method according to claim 9, wherein detecting the misconnection comprises detecting a maximum value and a minimum value from one or both of actually measured values of the d-axis current component and the a q-axis current component to detect the misconnection, when a value obtained by integrating actually measured values of the two-phase alternating current converted on a time axis is equal to or less than a threshold value.

15. The motor control method according to claim 14, wherein detecting the misconnection comprises:
- calculating a difference between the d-axis current component and the q-axis current component, which are included in the two-phase alternating current converted; and
- detecting the misconnection of the current detectors when a value obtained by integrating the difference calculated on the time axis is equal to or less than a threshold value.

16. The motor control method according to claim 9, wherein detecting the misconnection comprises detecting a maximum value and a minimum value from one or both of actually measured values of the d-axis current component and the a q-axis current component, when frequency components obtained by applying a Fourier transformation to actually measured values of the two-phase alternating current converted are approximately equal to multiples of power converter frequencies.

* * * * *